United States Patent
Smith et al.

(10) Patent No.: US 11,934,914 B1
(45) Date of Patent: Mar. 19, 2024

(54) METHODS AND SYSTEMS FOR FUSED CONTENT GENERATION FOR A BOOK HAVING PAGES INTERSPERSED WITH OPTICALLY READABLE CODES

(71) Applicant: Lifetime Health and Transportation LLC, Cincinnati, OH (US)

(72) Inventors: Latonya Smith, Florence, KY (US); Pierre Brown, Florence, KY (US)

(73) Assignee: Lifetime Health and Transportation LLC, Cincinnati, OH (US)

( * ) Notice: Subject to any disclaimer, the term of this patent is extended or adjusted under 35 U.S.C. 154(b) by 0 days.

(21) Appl. No.: 18/379,573

(22) Filed: Oct. 12, 2023

(51) Int. Cl.
*G06K 1/12* (2006.01)
*G06K 7/14* (2006.01)

(52) U.S. Cl.
CPC .......... *G06K 7/1417* (2013.01); *G06K 1/121* (2013.01)

(58) Field of Classification Search
CPC .............................. G06K 7/1417; G06K 1/121
USPC ........................................................ 235/494
See application file for complete search history.

(56) References Cited

U.S. PATENT DOCUMENTS

| | | | |
|---|---|---|---|
| 2004/0088326 A1* | 5/2004 | Lin | H04N 1/32133 |
| 2006/0124742 A1* | 6/2006 | Rines | G06F 16/9554 |
| | | | 235/462.15 |
| 2013/0334300 A1 | 12/2013 | Evans | |
| 2014/0339296 A1* | 11/2014 | McAdams | G06F 16/9554 |
| | | | 235/375 |
| 2016/0350066 A1* | 12/2016 | Poswal | G06F 3/165 |
| 2017/0039768 A1* | 2/2017 | Kim | H04N 9/3185 |
| 2017/0200390 A1 | 7/2017 | Seymour | |
| 2021/0255759 A1 | 8/2021 | Farrell | |

FOREIGN PATENT DOCUMENTS

BR  102018014314 A2  1/2020

OTHER PUBLICATIONS

Elen Mesropyan: "From Page to Screen: Exploring Movies and Comics with Scannable QR Codes". Critical Blast, Jun. 21, 2023, Retrieved from the internet < URL:http://www.criticalblast.com/articles/2023/06/21/page-screen-exploring-movies-and-comics-scannable-qr-codes>.

Adele Ankers-Range: "She-Hulk Includes QR Codes That Link to Free Marvel Comics." Aug. 25, 2022, Retrieved from the Internet <URL:https://www.ign.com/articles/she-hulk-qr-codes-free-marvel-comics>.

(Continued)

*Primary Examiner* — Paultep Savusdiphol
(74) *Attorney, Agent, or Firm* — Vorys, Sater, Seymour and Pease LLP (57) ABSTRACT

Methods and systems for generating content for a story in a book having multiple pages interspersed with optically readable codes. A method includes replacing sections of a book with respective optically readable codes, and storing digital media files in computer-readable memory accessible by a server. Each optically readable code has coded data to access a digital media file. Each digital media file has video and audio content covering a portion of the story. To consume an entire story, a person reads text on pages in some book sections and uses an optical scanning device to scan optically readable codes on pages in other book sections and access digital media files. A book may have an alternating sequence of chapters presented with textual content and other chapters presented with audiovisual content accessed by optically readable codes to cover an entire story.

19 Claims, 7 Drawing Sheets

(56) References Cited

OTHER PUBLICATIONS

J.W. Warren: "The College Cookbook: 101 Simple, Cheap and Healthy Recipes with QR Code Video Demonstrations." Apr. 29, 2023, Retrieved from the Internet <URL:https://www.amazon.com/College-Cookbook-Healthy-Recipes-Demonstrations/dp/B0C2SFNHMJ>.
"The first cookbook of its kind!" Copyright 2023 Retrieved from the Internet <URL:https://madeitateitlovedit.com/cookbook/order/>.
Robyn Albertyn: "How to Find a Marvel QR Code in Ms. Marvel and She-Hulk." Oct. 12, 2022, Retrieved from the Internet <URL:https://www.qr-code-generator.com/blog/marvel-qr-code-in-shows/>.
Mike Matas: "A Next-generation digital book." TED Talk, Apr. 28, 2011, Retrieved from the Internet <URL:https://www.youtube.com/watch?v=LV-RvzXGH2Y>.
"What is LIT Videobooks." LIT Videobooks, Jan. 31, 2022, Retrieved from the Internet <URL:https://www.youtube.com/watch?v=Mj8z5UFbjug>.
"Every Hidden QR Code in She-Hulk: Attorney At Law." Rocket Riley, Oct. 18, 2022 Retrieved from the Internet <URL:https://www.youtube.com/watch?v=tk6kSJQ2jFU>.

* cited by examiner

| IDENTIFIER | FILENAME |
|---|---|
| 101 | FILE 1 |
| 102 | FILE 2 |

METHODS AND SYSTEMS FOR FUSED CONTENT GENERATION FOR A BOOK HAVING PAGES INTERSPERSED WITH OPTICALLY READABLE CODES

FIELD OF THE DISCLOSURE

The technical field relates generally to electronic content presentation and storytelling.

BACKGROUND OF THE DISCLOSURE

When reading a novel, memoir, autobiography, or any other genre in traditional text within a book, the reader is left to visually interpret the story using their own imagination unless illustrations are provided within the text. Pictures within books have long assisted authors in expressing their vision, but still images remain eclipsed by the expressive potential of motion film and video.

Scannable codes have been used in books and in television programming to facilitate access to supplemental content. QR codes are machine-readable codes consisting of an array of black and white squares, typically used for storing URLs or other information to be read by the camera on a smartphone. These codes can deliver supplemental content to enhance any content-consuming experience. For example, creators have developed cookbooks that provide a QR Code leading to a video demonstration of the written instructions for each recipe. Recently filmmakers have positioned QR codes throughout their television series, which—upon scanning—the viewer would receive a free comic book unrelated to the current episode. Further, interactive eBooks have used both electronic text and links to audio or video files without scannable codes. However, all these conventional techniques fail to fuse both printed text and video content to present a continuous story.

SUMMARY OF THE DISCLOSURE

Various details of the present disclosure are hereinafter summarized to provide a basic understanding. This summary is not an extensive overview of the disclosure and is neither intended to identify certain elements of the disclosure, nor to delineate the scope thereof Rather, the primary purpose of this summary is to present some concepts of the disclosure in a simplified form prior to the more detailed description that is presented hereinafter.

In one embodiment, a book having content for a story includes a book binding and a plurality of pages held in place by the book binding, and first and second groups of sections. The first group of sections has at least textual content on pages covering respective portions of the story. The second group of sections has optically readable codes on pages, wherein the optically readable codes encode information to access respective digital media files having audiovisual content covering respective portions of the story different than the portions of the story covered by the first group of sections, and wherein the first and second groups of sections cover the entire story of the book.

In another embodiment, a method for generating content for a story in a book having multiple pages is provided. The method includes replacing one or more sections of a book with one or more respective optically readable codes corresponding to replaced sections, and storing one or more digital media files in computer-readable memory accessible by a server. Each digital media file has video and audio content covering a portion of the story of a respective replaced section of the book. Each optically readable code identifies a respective digital media file. In this way, a person reading the book with an optical scanning device may read text on pages in some sections of the book and use the optical scanning device sections to scan optically readable code on pages in other sections of the book and access digital media files to consume the content of the entire story in the book.

In another embodiment, a system for serving content for a story in a book having multiple pages with textual content interspersed with one or more optically readable codes is provided. The system includes a server configured to receive from a remote device a signal representative of a first scanned optically readable code in the book, access a digital media file corresponding to the first scanned optically readable code, and output the accessed digital media file to the remote device for display to a user, whereby, a user reading the book with an optical scanning device may read the textual content on pages in some sections of the book and use an optical scanning device to scan optically readable codes on pages in other sections of the book and access respective digital media files to consume the content of the entire story in the book.

Any combinations of the various embodiments and implementations disclosed herein can be used in a further embodiment consistent with the disclosure. These and other aspects and features can be appreciated from the following description of certain embodiments presented herein in accordance with the disclosure and the accompanying drawings and claims.

DETAILED DESCRIPTION

Embodiments of the present disclosure will now be described in detail with reference to the accompanying Figures. Like elements in the various figures may be denoted by like reference numerals for consistency. Further, in the following detailed description of embodiments of the present disclosure, numerous specific details are set forth in order to provide a more thorough understanding of the claimed subject matter. However, it will be apparent to one of ordinary skill in the art that the embodiments disclosed herein may be practiced without these specific details. In other instances, well-known features have not been described in detail to avoid unnecessarily complicating the description. Additionally, it will be apparent to one of ordinary skill in the art that the scale of the elements presented in the accompanying Figures may vary without departing from the scope of the present disclosure.

Embodiments in accordance with the present disclosure generally relate to electronic content presentation and storytelling.

A Book of Fused Content

Figure 1:
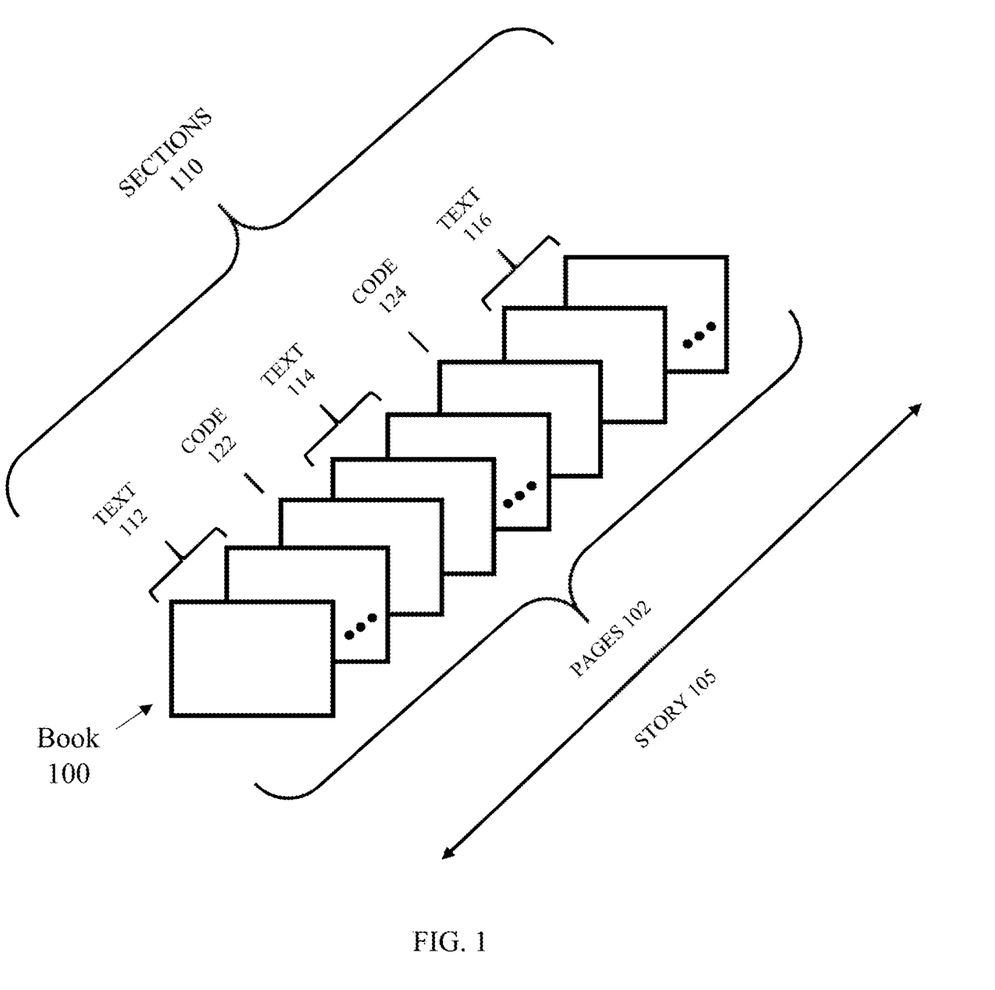
FIG. 1 is a diagram of a book having pages interspersed with optically readable codes according to an embodiment of the present invention.

FIG. 1 is a schematic diagram of a book 100 having content for a story 105 presented in a plurality of pages 102 according to an embodiment. In one example, pages 102 may be held in place by a cover and book binding.

Book 100 has sections 110 made up of a group of sections having textual content 112, 114, 116 interspersed with another group of sections having optically readable codes 122, 124. Optically readable codes 122, 124 encode information to access respective digital media files having audiovisual content. This audiovisual content covers respective portions of story 105 differently than the portions of story 105 covered by the textual content 112, 114, 116. In this way, textual content and audiovisual content are fused in multiple sections which allows a user to experience story 105 in book 100 through both reading pages and viewing audiovisual content.

Figure 2:
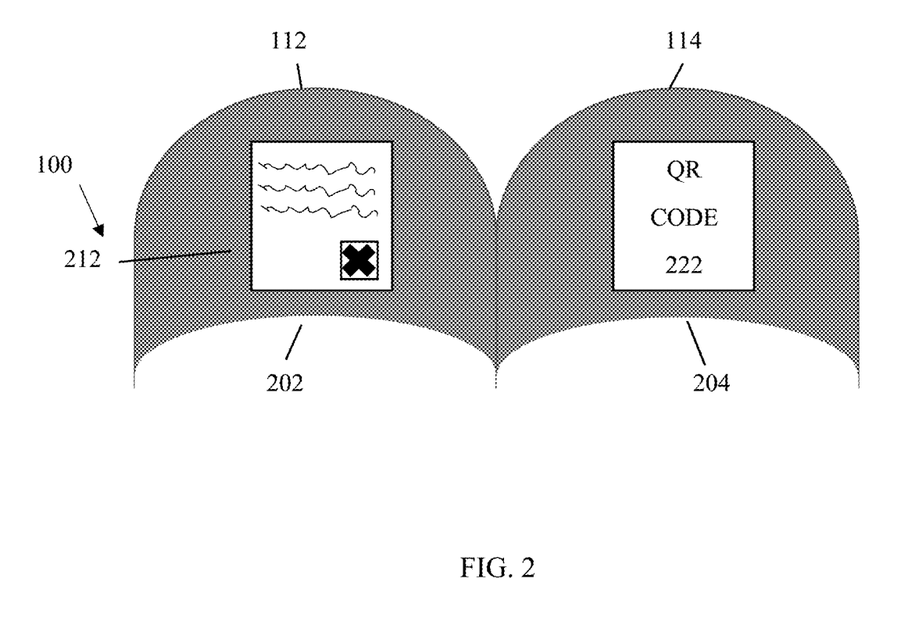
FIG. 2 shows an example of two pages having textual content and an optically readable code for accessing a digital media file having audiovisual content in the same story according to an embodiment of the present invention.

To read book 100, a user may read pages having textual content 112, 114, 116 and scan codes optically readable codes 122, 124 to view the respective digital media files and consume the entire story 105. For example, as shown in further detail in FIG. 2, textual content 112 may be printed in section 212 on a left side page 202 of book 100 when opened. An optically readable code, such as, a QR code 222, may be printed on a right side page 204 of book 100. Section 212 for example may have text for a user to read. Section 212 may also have an image or an illustration for a user to view on page 202. When the user turns to page 204, the user can use a scanner, such as a scanner application on a mobile phone, to scan QR code 222. QR code 222 may encode information identifying a web address which can access a respective digital media file with audiovisual content in the same story as the content in section 212.

Book to Film System

Figure 3:
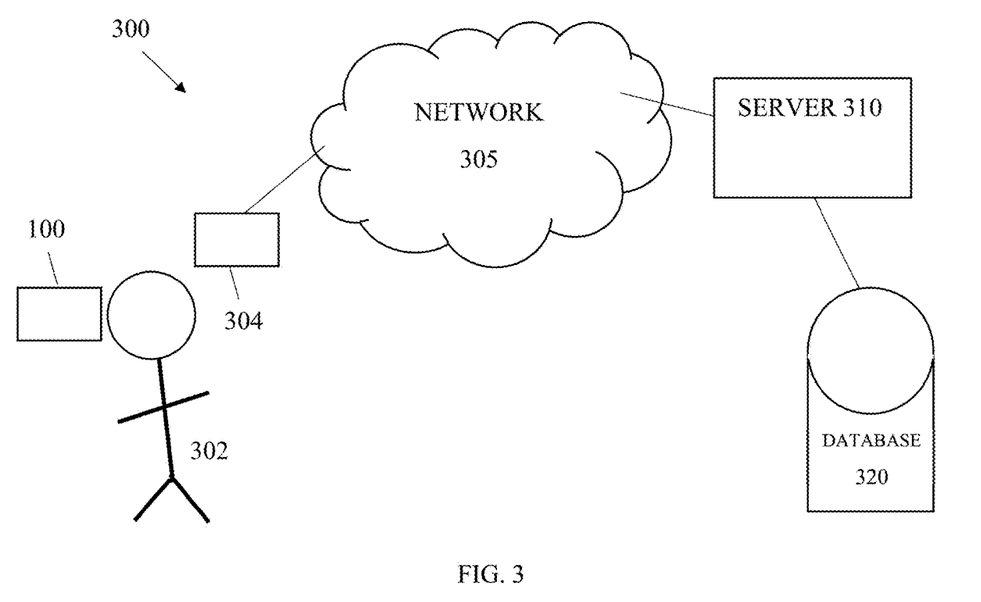
FIG. 3 is a system for generating content according to an embodiment of the present invention.

FIG. 3 is a diagram of a system 300 for serving content for a story in a book 100 having fused textual and audiovisual content according to an embodiment. System 300 includes a server 310 coupled over a data network 305 to one or more remote devices 304. Server 310 is configured to communicate with remote devices 304 over data network 305. A database 320 is coupled to server 310, and configured to store one or more digital media files. Each digital media file may be identified by a respective file name. Remote devices 304 may be one more computing devices operated by respective users 302. Server 310 may be implemented on one or more computing devices. Data network 305 may be any type of computer data network or combination of networks such as the Internet.

In operation, a user 302 may read book 100 while operating a remote device 304, such as a mobile device including a smart phone, that can communicate with server 310. Server 310 is configured to receive signals from remote devices 304 that represent the information in scanned optically readable codes 222 in the book, access the digital media files 400 corresponding to that optically readable code 222, and then output the digital media file 400 to the remote device 304 for display to a user 302.

Figure 4:
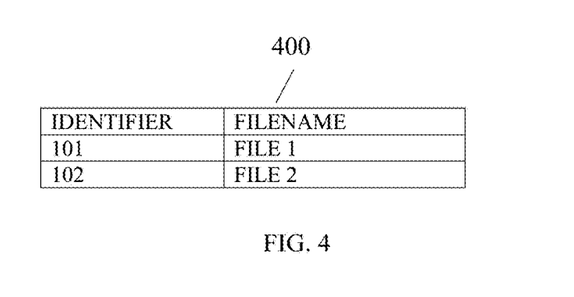
FIG. 4 shows an example lookup table for identifier and file name data.

In one embodiment, as shown in FIG. 4, a look up table 400 may be stored in computer-readable readable memory on server 310. Look up table 400 associates an identifier with a respective digital media file name. In this way, each QR code 222 may encode information about the identifier. Server 310 may then processed the scanned code and extract the identifier. Alternatively, the remote device 304 may process the scanned code and extract the identifier and send the identifier to server 310.

In one embodiment, QR code may encode information on a file identifier along with an address for a server 310 (or other content server). For example, QR code may include information representative of a URL address for a content server at or accessible by server 310 and a file identifier for accessing a respective digital media file. Server 310 can then output the digital media file to the remote device 304 for display. For example, once an identifier is received, server 310 uses look up table 400 to determine a respective file name and sends a request for the digital media file based in the file name to database 320. Database 320 returns the digital media file to server 310 for forwarding to remote device 304 for viewing by user 302.

Alternatively, the remote device 304 may process the scanned code and extract the URL address and a file identifier for accessing a respective digital media file from a content server hosting the digital media file and retrieve the file for display on the remote device 304.

Look up table 400 is illustrative and not intended to be limiting. Other types of information may be used to identify a stored digital media file or its address as would be apparent to a person skilled in the art given this description. Similarly, other types of information may be encoded in a QR code or other type of code to enable server 310 to access a respective stored digital media file.

The operation of system 300 is further described below with respect to computer-implemented methods for producing and consuming content in FIGS. 5-6 and an illustrative diagram in FIG. 7.

Generating Content for a Story

Figure 5:
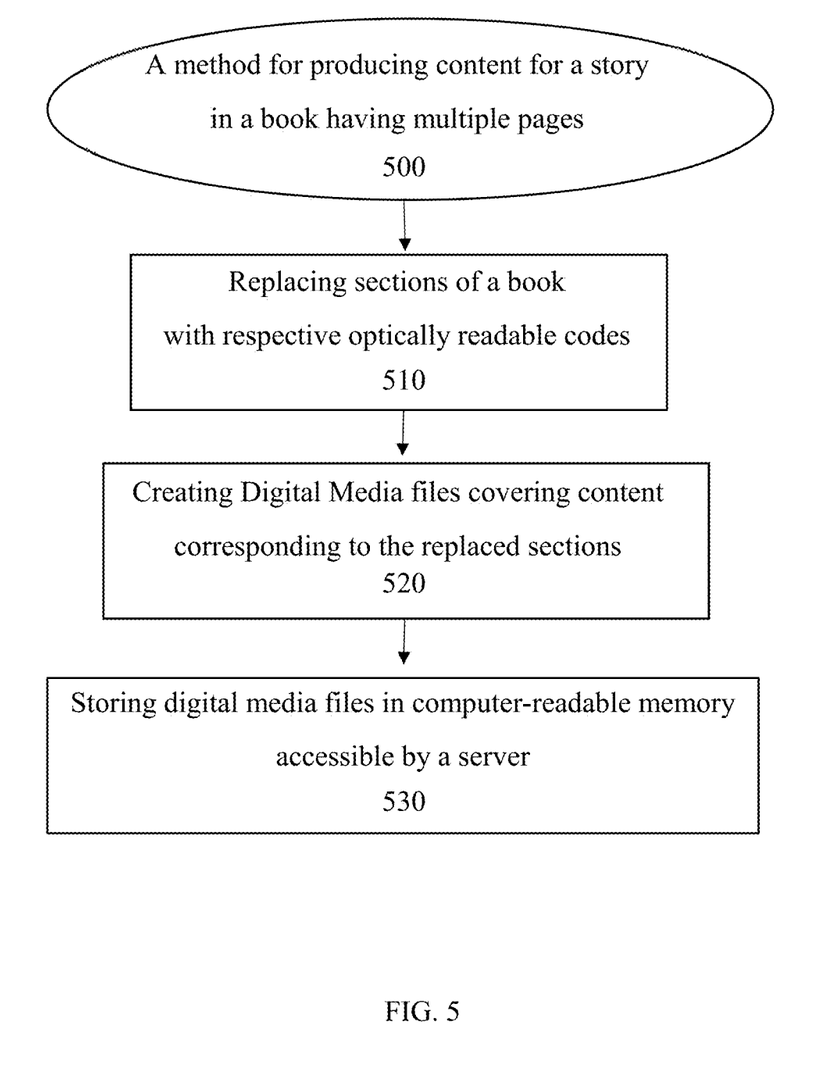
FIG. 5 is a flowchart diagram of a method for producing content according to an embodiment of the present invention.

FIG. 5 is an example method 500 for producing content for a story in a book having multiple pages (steps 510-530). At step 510, one or more sections of the book are replaced with one or optically readable codes corresponding to the replaced sections.

In step 520 digital media files are created having video and audio content covering the portion of the story of the respective replaced section of the book in step 510. In step 530, one or more digital media files are stored in computer-readable memory accessible by a server. The digital media files contain video and audio content covering portions of the story of the respective replaced sections of the book.

For example, to create a new fused work from an existing book, a producer in step 510 may begin select a second group of sections of the existing book to replace. In step 520, a producer may then record audiovisual content for the second group of sections. The producer may then process the recorded audiovisual content to obtain one or more digital media files. The digital media files may then be stored in computer-readable memory accessible by a content server (step 530). In this way, each digital media file has video and audio content covering a respective portion of the story in the second group of sections.

Optically readable codes may then be created using a QR code generator. The QR codes correspond to the respective stored digital media files. Then a book is printed having multiple pages including pages with the original authored textual content and optically readable codes on pages in the replaced sections.

For example, a producer may wish to produce a fused book relating to *The Odyssey* by Homer made up of 24 chapters (also called books in some translations). A producer in step 510 may decide to replace Chapter 2 Telemachus Sets Sail and Chapter 22 Slaughter in the Hall with audiovisual content. The producer then records or accesses audiovisual content for these replaced sections, and processes the recorded audiovisual content to obtain corresponding digital media files (step 520). The audiovisual content covers the story content of Chapter 2 and 22. The digital media files may then be stored in computer-readable memory accessible by a content server in step 530. The producer may then use a QR code generator to generate QR codes for respective stored digital media files. Then the producer prints a book having multiple pages including pages with the original authored textual content of *The Odyssey* along with optically readable codes (QR codes) on pages in the replaced sections for Chapter 2 and Chapter 22.

In still further examples, a producer may produce content for an entirely new work. In this case, in step 510 rather than replace sections of an existing work, a producer can draft textual content for a first group of sections. Likewise, in step 520, the producer of the new work would record audiovisual content for a second group of sections. Digital media files (stored in step 530) and corresponding optically scannable codes would also be generated.

For example, a producer may create a new book where half of the chapters are written in text. The other half of the chapters are created via animation and voice acting and recorded in digital media files. These video portions are then processed and uploaded and stored online in digital media files, where they can later be accessed by readers scanning the corresponding QR code located within the pages of the book.

Consuming Fused Book-to-Film Content

Figure 6A:
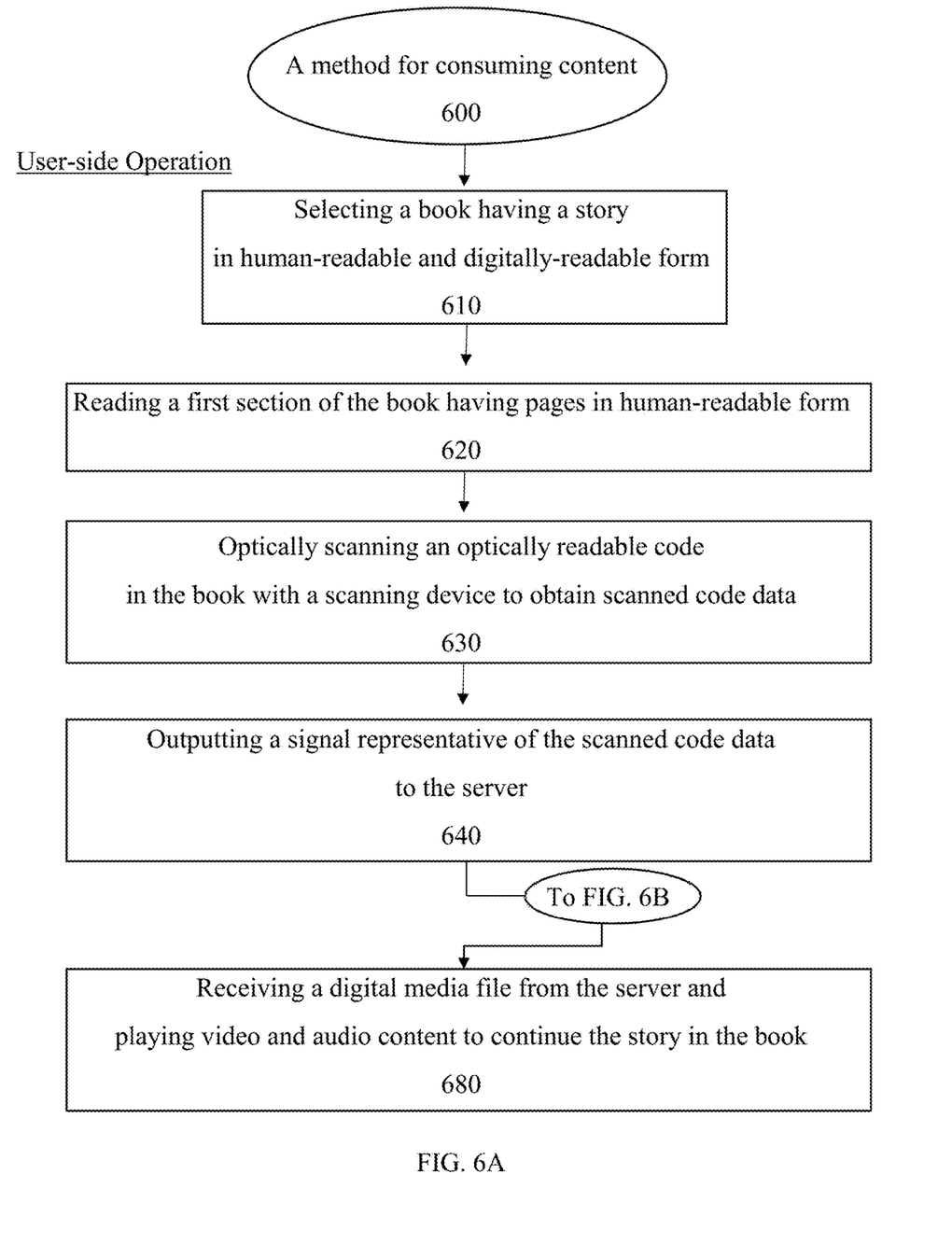
FIGS. 6A and 6B are flowchart diagrams of a method for consuming content with respective user-side and server-side operations according to an embodiment of the present invention.
Figure 6B:
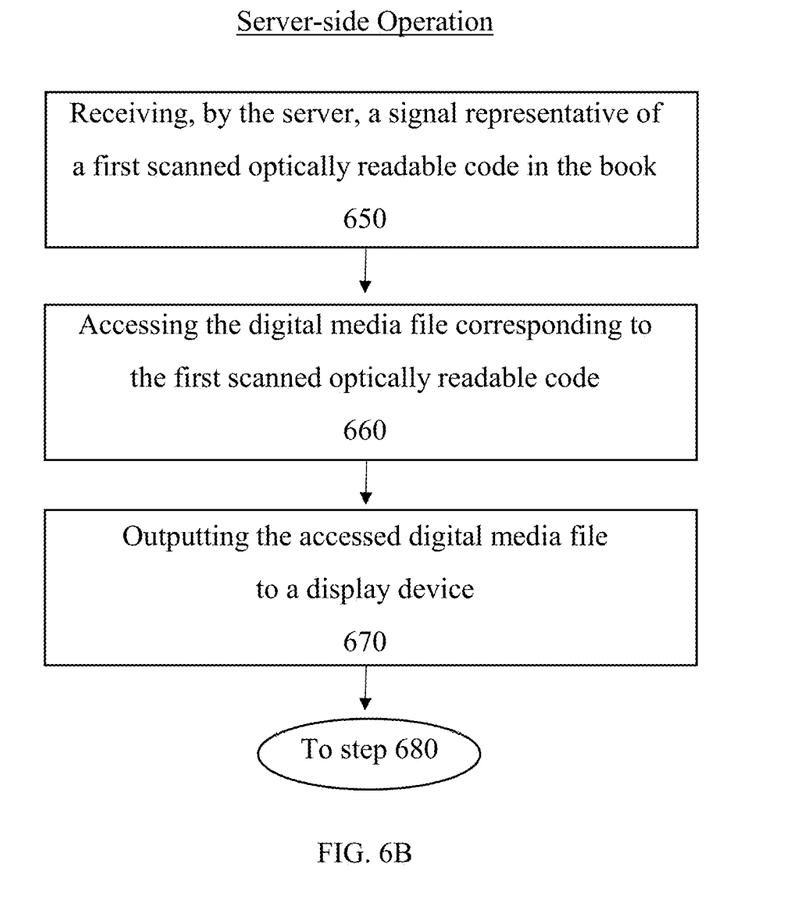

FIGS. 6A and 6B show a method 600 for consuming fused book-to-film content for a story in a book having multiple pages according to an embodiment (steps 610-680). Method 600 includes user-side and server-side operations. For brevity reference is made to system 300 but method 600 may be used with other system configurations.

First, a user selects a book having a story in human-readable and digitally readable form (step 610). The user then reads a first section having pages in human-readable form (step 620). Next, when a user encounters a page with an optically readable code, the user optically scans the optically readable code on the page with a scanner (step 630). For example, the user may use a scanner provided on a remote device 304 (such as a mobile device like a smartphone having a camera and a QR code processing application). Next control proceeds to output a signal representative of the scanned code information to a server (step 640). For example, an application on remote device 304 may send a signal with the scanned code information to server 310.

On the server-side as shown in FIG. 6B, the signal representative of the scanned code information is received (step 650). Server 310 may then access the digital media file corresponding to the scanned code information (step 660). For example, if already done by the mobile device, server 310 may extract a URL address and file identifier. Server 310 may then make a request to a content server or database 320 using the URL address and file identifier to request the digital media file. When the digital media file is returned, server 310 outputs the digital media file to remote device 304 for display (step 670).

Returning to the user-side, in step 680 the digital media file is received at remote device 304 and output for display on remote device 304. For example, an audiovisual player application may open and allow a user see and hear audiovisual content for that portion of the story. When the file is done playing, the user can return to the book, turn the page and continue reading the book and access audiovisual content through scanned codes until they finish the book.

Further Examples

Figure 7:
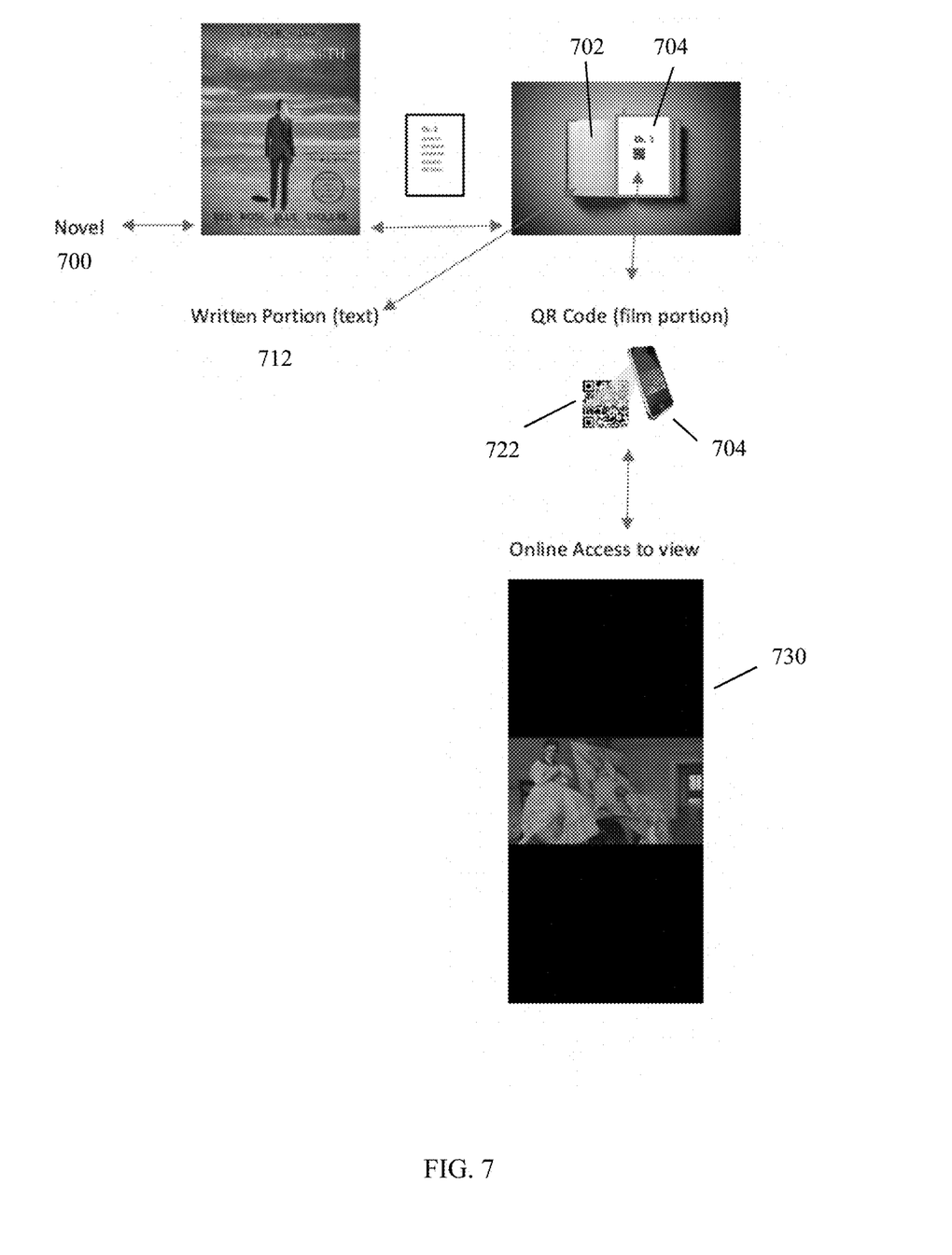
FIG. 7 is a diagram illustrating fused content generation for a story in a book having pages interspersed with optically readable codes according to one example.

FIG. 7 is a diagram illustrating fused content generation for a story in a novel 700 having pages interspersed with optically readable codes according to one example. Novel 700 has multiple pages of textual content interspersed with optically readable codes. For example, textual content 712 may be on one page 702. A QR code 722 (corresponding to a film/audiovisual content) may be on another page 704. A mobile device 704 with a browser and optical scanning device (e.g. camera and scanning application) may be used to scan QR code 722. Mobile device 704 is configured to communicate over a data network to access online content identified by information extracted from the scanned QR code. For example, the optical scanning device may optically scan optically readable code 722 in novel 700 to obtain code data. The code data includes information representative of a URL address and a file identifier, and the browser uses the URL address to communicate with a server 310 (or other content server) to request a digital media file 730 corresponding to the file identifier extracted from the coded data. Mobile device 704 then displays the audio or visual content in the digital media file 730 such that the user can continue the same story in the book 700 as prior textual content 712 presented in other portions of the book 700 for reading. In embodiments, the scanned optically readable code is a QR Code but is not so limited and other types of codes or scannable information may be used.

Further Embodiments and Example Implementations

Books 100 and 700 are illustrative and not intended to be limiting. Books in embodiments may have textual context and optically readable codes interspersed in any order across one more pages depending on a particular book and the story an author tells or producer wishes to produce. An author may write a book with portions of the content in text and other portions of the content in film or video recordings. For example, Chapter 1 of a fictional novel is written in text while Chapter 2 of the novel is film or motion picture content.

In embodiments, the story may be a novel having multiple chapters, and the first group of sections comprise one set of chapters and the second group of sections comprise another set of chapters, such that the reader may experience a fusion of textual content in the one set of the chapters and audiovisual content in the second set of chapters. For example, TAHARA is a fictional book series about a woman trying to navigate through friendships, relationships, and her own personal entrepreneurship. Six chapters are written in text within the pages of the book. Four other chapters are filmed and recorded with real actors and actresses. These four chapters are exclusively accessed within the pages of the book by scanning four QR codes located in the pages and viewing the episodes via the user's smartphone.

In embodiments, the book may contain an alternating sequence of chapters presenting textual content and chapters presenting audiovisual content to cover an entire single story. For example, the book can contain any combination or sequence of the chosen media, such as ten chapters of text and 1 chapter of audiovisual content, or an equal 5 chapters of each. Other combinations, ordering of sections and pages, and configurations may be used as would be apparent to a person skilled in the art.

In a further embodiment, a book having content for a story, comprises: a book binding and a plurality of pages held in place by the book binding; a first group of sections having at least textual content on pages covering respective portions of the story; and a second group of sections having optically readable codes on pages, wherein the optically readable codes encode information to access respective digital media files having audiovisual content covering respective portions of the story different than the portions of the story covered by the first group of sections, wherein the first and second groups of sections cover the entire story of the book. The book has a story that comprises a novel having multiple chapters, and the first group of sections comprise one set of chapters and the second group of sections comprise another set of chapters, such that a reader may experience a fusion of textual content in the one set of chapters and audiovisual content in the second set of chapters. The book has an alternating sequence of chapters presented with textual content and chapters presented with audiovisual content to cover an entire single story.

For all the above embodiments, the following examples expand upon the definitions of consistent terminology. For all the above embodiments, the following examples are illustrative and not intended to be limited.

In embodiments, remote devices 304, mobile devices 704, and optical scanning devices can be any electronic computing device with optical code reading capabilities. Example computing devices may include, but are not limited to, a smartphone; smart glasses; VR/AR headset; a camera; a personal computer; a laptop computer; a personal digital assistant; a data-enabled cellular telephone; kiosk; embedded device; console; or a notebook or tablet computer. In addition to at least one processor and memory, such a device may include software, firmware, hardware, or a combination thereof. Software may include one or more applications, a browser, and an operating system. Operating systems may include, but are not limited to, Microsoft Windows™; Android™; WebOS™; or iOS™ or a custom operating system. Hardware can include, but is not limited to, a processor, memory, display or other input/output device. A communication interface and transceiver can be included to perform data communication (wired or wireless) over network 305.

In embodiments, examples of digital media files include, but are not limited to, MPEG-1, AVI, MPEG-4, and MOV for video files; MP3, WAV, AAC, for audio files; and JPEG, GIF, and PNG for picture files.

Audio and visual content can be, but are not limited to, movies on film or digital mediums, stop-motion animation, computer-generated imaging, music videos, audio narration, music, and ambiance noises and sounds.

In embodiments, optically readable codes can be any code that can be read and interpreted via a picture-scanning device or optical scanner including, but not limited to, QR Codes, Barcodes, and RFID codes.

In embodiments, data network 305 can be any data network including, but not limited to, a local area network, a wide area network, or an intranet. Data network 305 may be connected to one or more secondary networks, examples of which include, but are not limited to, a local area network, a wide area network, or an intranet.

Aspects of the embodiments for exemplary system 300 including server 310 (and remote devices 304) and database 320 thereof may be implemented electronically using hardware, software modules, firmware, tangible computer readable or computer usable storage media having instructions stored thereon, or a combination thereof and may be implemented in one or more computer systems or other processing systems. In embodiments, server 310 (and remote devices 304) and database 320 may be implemented electronically using hardware, software modules, firmware, tangible computer readable or computer usable storage media having instructions stored thereon, or a combination thereof and may be implemented in one or more computer systems or other processing systems at the same location or different locations.

Database 320, for example, may be a database platform running database management software available from an organization such as a commercial vendor or open source community.

Embodiments may be directed to computer products comprising software stored on any computer usable medium such as memory. Such software, when executed in one or more data processing devices, causes such data processing device(s) to operate as described herein.

In an embodiment, system 300 including server 310 and database 320 may be implemented in an architecture distributed over one or more networks 305, such as, for example, a cloud computing architecture. Cloud computing includes, but is not limited to, distributed network architectures for providing, for example, software as a service (SaaS); infrastructure as a service (IaaS); platform as a service (PaaS); network as a service (NaaS); data as a service (DaaS); database as a service (DBaaS); backend as a service (BaaS); test environment as a service (TEaaS); application programming interface as a service (APIaaS); or an integration platform as a service (IPaaS).

In embodiments, server 310 may be coupled to one or more web servers to support World Wide Web protocols and services. Server 310 may also communicate with other servers or applications and may send and retrieve data through application programming interfaces (APIs). Server 310 may also be part of a cluster of servers or other architectures such as an API gateway architecture having a gateway API and a cluster of servers.

In view of the foregoing structural and functional description, those skilled in the art will appreciate that portions of the embodiments may be embodied as a method, data processing system, or computer program product. Accordingly, these portions of the present embodiments may take the form of an entirely hardware embodiment, an entirely software embodiment, or an embodiment combining software and hardware. Furthermore, portions of the embodiments may be a computer program product on a computer-usable storage medium having computer readable program code on the medium. Any non-transitory, tangible storage media possessing structure may be utilized including, but not limited to, static and dynamic storage devices, hard disks, optical storage devices, and magnetic storage devices; but excludes any medium that is not eligible for patent protection under 35 U.S.C. § 101 (such as a propagating electrical or electromagnetic signal per se). As an example and not by way of limitation, a computer-readable storage media may include a semiconductor-based circuit or device or other integrated circuit (IC) (such as, for example, a field-programmable gate array (FPGA) or an ASIC); a hard disk; an HDD; a hybrid hard drive (HHD); an optical disc; an optical disc drive (ODD); a magneto-optical disc; a magneto-optical drive; a floppy disk; a floppy disk drive (FDD); magnetic tape; a holographic storage medium; a solid-state drive (SSD); a RAM-drive; a SECURE DIGITAL card; a SECURE DIGITAL drive; or another suitable computer-readable storage medium or a combination of two or more of these, where appropriate. A computer-readable non-transitory storage medium may be volatile, nonvolatile, or a combination of volatile and non-volatile, where appropriate.

Certain embodiments have also been described herein with reference to block illustrations of methods, systems, and computer program products. It will be understood that blocks of the illustrations, and combinations of blocks in the illustrations, can be implemented by computer-executable, or machine-readable, instructions. These computer-executable instructions may be provided to one or more processors of a general-purpose computer, special purpose computer, or other programmable data processing apparatus (or a combination of devices and circuits) to produce a machine, such that the instructions, which execute via the processor, implement the functions specified in the block or blocks.

These computer-executable instructions may also be stored in computer-readable memory that can direct a computer or other programmable data processing apparatus to function in a particular manner such that the instructions stored in the computer-readable memory result in an article of manufacture including instructions that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

The terminology used herein is for the purpose of describing particular embodiments only and is not intended to be limiting of the invention. As used herein, for example, the singular forms "a," "an," and "the" are intended to include the plural forms as well unless the context clearly indicates otherwise. It will be further understood that the terms "contains", "containing", "includes", "including," "comprises", and/or "comprising," and variations thereof, when used in this specification, specify the presence of stated features, integers, steps, operations, elements, and/or components, but do not preclude the presence or addition of one or more other features, integers, steps, operations, elements, components, and/or groups thereof.

Terms of orientation are used herein merely for purposes of convention and referencing and are not to be construed as limiting. However, it is recognized these terms could be used with reference to an operator or user. Accordingly, no limitations are implied or to be inferred. In addition, the use of ordinal numbers (e.g., first, second, third, etc.) is for distinction and not counting. For example, the use of "third" does not imply there must be a corresponding "first" or "second." Also, if used herein, the terms "coupled" or "coupled to" or "connected" or "connected to" or "attached" or "attached to" may indicate establishing either a direct or indirect connection, and is not limited to either unless expressly referenced as such.

While the disclosure has described several exemplary embodiments, it will be understood by those skilled in the art that various changes can be made, and equivalents can be substituted for elements thereof, without departing from the spirit and scope of the invention. In addition, many modifications will be appreciated by those skilled in the art to adapt a particular instrument, situation, or material to embodiments of the disclosure without departing from the essential scope thereof. Therefore, it is intended that the invention not be limited to the particular embodiments disclosed, or to the best mode contemplated for carrying out this invention, but that the invention will include all embodiments falling within the scope of the appended claims. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

What is claimed is:

1. A method for generating content for a story in a book having multiple pages comprising:
    replacing one or more sections of a book with one or more respective optically readable codes corresponding to replaced sections; and
    storing one or more digital media files in computer-readable memory accessible by a server, each digital media file having video and audio content covering a portion of the story of a respective replaced section of the book, and wherein each optically readable code identifies a respective digital media file, whereby, a person reading the book with an optical scanning device may read text on pages in some sections of the book and use the optical scanning device sections to scan optically readable code on pages in other sections of the book and access digital media files to consume the content of the entire story in the book.

2. The method of claim 1, further comprising:
    creating each digital media file having video and audio content covering the portion of the story of the respective replaced section of the book.

3. The method of claim 1, further comprising:
    receiving, by the server, a signal representative of a first scanned optically readable code in the book;
    accessing the digital media file corresponding to the first scanned optically readable code; and
    outputting the accessed digital media file to a display device.

4. The method of claim 3, further comprising:
    optically scanning the first scanned optically readable code in the book with a scanning device to obtain code data; and
    outputting a signal representative of the code data to the server for receipt by the server as the signal representative of the first scanned optically readable code in the book.

5. The method of claim 4, wherein first scanned optically readable code comprises a QR code.

6. The method of claim 5, wherein the QR code includes information representative of a URL address for a server and a file identifier for accessing a respective digital media file.

7. A method for producing fused book-to-film content for a story in a book having multiple pages comprising:
- authoring textual content for a first group of sections covering respective portions of the story;
- recording audiovisual content for a second group of sections covering respective portions of the story different than the portions of the story covered by the first group of sections;
- processing the recorded audiovisual content to obtain one or more digital media files;
- storing the one or more digital media files in computer-readable memory accessible by a server, each digital media file having video and audio content covering a respective portion of the story in the second group of sections;
- creating optically readable codes corresponding to respective stored digital media files; and
- printing a book having multiple pages including pages with the authored textual content and the optically readable codes.

8. The method of claim 7, wherein the optically readable codes comprises QR codes.

9. The method of claim 8, wherein each QR code includes information representative of a URL address for a server and a file identifier for accessing a respective digital media file.

10. A system for serving content for a story in a book having multiple pages with textual content interspersed with one or more optically readable codes, comprising:
- a server configured to communicate with one or more remote devices over a data network;
- computer-readable memory, coupled to the server, and configured to store one or more digital media files accessible by a server, each digital media file having video and audio content covering a portion of the story of a respective replaced section of the book;
- wherein the server is configured to:
  - receive from a remote device a signal representative of a first scanned optically readable code in the book;
  - access a digital media file corresponding to the first scanned optically readable code; and
  - output the accessed digital media file to the remote device for display to a user,
- whereby, a user reading the book with an optical scanning device may read the textual content on pages in some sections of the book and use an optical scanning device to scan optically readable codes on pages in other sections of the book and access respective digital media files to consume the content of the entire story in the book.

11. The system of claim 10, wherein the optically readable codes comprise QR codes.

12. The system of claim 11, wherein each QR code includes information representative of a URL address for the server and a file identifier for accessing a respective digital media file.

13. The system of claim 12, wherein the remote device processes the scanned QR code to identify the URL address for the server and the file identifier, and communicates with the server using the URL address and outputs the file identifier to the server to request the respective digital media file.

14. The system of claim 12, further comprising a database having the computer-readable memory and further configured to store a plurality of digital media files.

15. A system for reading fused book-to-film content in a book having multiple pages of textual content interspersed with optically readable codes, comprising:
- a mobile device having a browser and an optical scanning device and configured to communicate over a data network;
- wherein the optical scanning device is configured to optically scan an optically readable code in a book to obtain code data,
- wherein the code data includes information representative of a URL address and a file identifier, and the browser uses the URL address to communicate with the server and requests from the server a digital media file corresponding to the file identifier extracted from the coded data; and wherein mobile device further initiates display of audiovisual content in digital media file returned by the server such that a user can continue the same story in the book as prior textual content presented in other portions of the book for reading.

16. The system of claim 15, wherein scanned optically readable code comprises a QR code.

17. The system of claim 15, wherein the book has content for a story, and the book further comprises:
- a book binding and a plurality of pages held in place by the book binding;
- a first group of sections having at least textual content on pages covering respective portions of the story; and
- a second group of sections having optically readable codes on pages, wherein the optically readable codes encode information to access respective digital media files having audiovisual content covering respective portions of the story different than the portions of the story covered by the first group of sections, wherein the first and second groups of sections cover the entire story of the book.

18. The system of claim 17, wherein the story comprises a novel having multiple chapters, and the first group of sections comprise one set of chapters and the second group of sections comprise another set of chapters, such that a reader may experience a fusion of textual content in the one set of chapters and audiovisual content in the second set of chapters.

19. The system of claim 17, wherein the book has an alternating sequence of chapters presented with textual content and chapters presented with audiovisual content to cover an entire single story.

* * * * *